US009204005B2

(12) United States Patent (10) Patent No.: US 9,204,005 B2
Kitagawa et al. (45) Date of Patent: Dec. 1, 2015

(54) IMAGE FORMING APPARATUS USABLE WITH A MEMORY CARD

(71) Applicants: Osamu Kitagawa, Miyagi (JP); Yasuharu Matsubara, Miyagi (JP); Hisayoshi Imai, Miyagi (JP)

(72) Inventors: Osamu Kitagawa, Miyagi (JP); Yasuharu Matsubara, Miyagi (JP); Hisayoshi Imai, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/784,954

(22) Filed: Mar. 5, 2013

(65) Prior Publication Data

US 2013/0235429 A1 Sep. 12, 2013

(30) Foreign Application Priority Data

Mar. 6, 2012 (JP) ................................. 2012-049140

(51) Int. Cl.
*H04N 1/00* (2006.01)
(52) U.S. Cl.
CPC ....... *H04N 1/00965* (2013.01); *H04N 1/00339* (2013.01); *H04N 2201/0051* (2013.01); *H04N 2201/0063* (2013.01); *H04N 2201/0091* (2013.01)
(58) Field of Classification Search
CPC .................................................. H04N 1/00965
USPC .................. 358/1.16, 296; 711/115; 439/131; 710/301
See application file for complete search history.

(56) References Cited

U.S. PATENT DOCUMENTS

| 6,773,275 | B1* | 8/2004 | Chen ............................... 439/92 |
| 7,177,159 | B2* | 2/2007 | Wang et al. ................... 361/797 |
| 2003/0035040 | A1* | 2/2003 | Hwang ......................... 347/108 |
| 2005/0002146 | A1* | 1/2005 | Albano et al. ................ 361/220 |
| 2006/0084296 | A1* | 4/2006 | Aizawa ............................ 439/79 |
| 2006/0223381 | A1* | 10/2006 | Combs et al. ................. 439/677 |
| 2010/0248551 | A1* | 9/2010 | Harada ......................... 439/636 |

FOREIGN PATENT DOCUMENTS

| JP | 2004-101590 | | 4/2004 |
| JP | 2006-175613 | | 7/2006 |
| JP | 2006175613 | A * | 7/2006 |
| JP | 2003-165596 | | 9/2007 |

* cited by examiner

*Primary Examiner* — Jacky X Zheng
(74) *Attorney, Agent, or Firm* — Harness, Dickey & Pierce

(57) ABSTRACT

According to an embodiment, provided is an image forming apparatus available for use with a memory card, the memory card including a housing that includes a built-in memory device and a terminal exposed from the housing. The image forming apparatus includes: a memory-card storing section that includes a pit for storing the memory card therein, the memory-card storing section being provided in a main body of the image forming apparatus as an apparatus main body; and an outer cover detachably attached to the apparatus main body to cover the memory-card storing section. At least one portion of the memory-card storing section is configured to be brought into contact with the housing of the memory card when the memory card is stored in the memory-card storing section and is configured to be electrically connected to a ground of the apparatus main body.

12 Claims, 8 Drawing Sheets

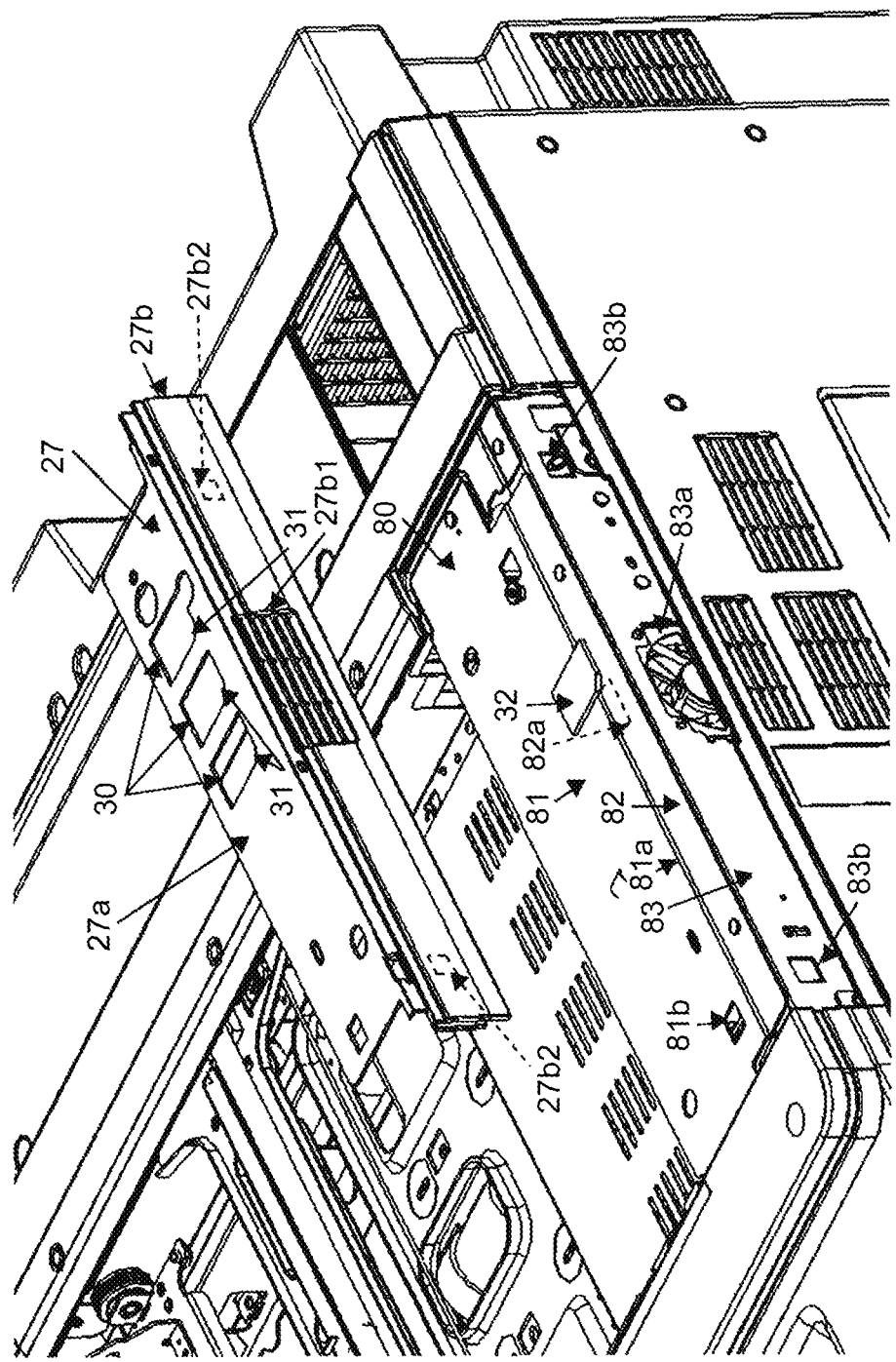

IMAGE FORMING APPARATUS USABLE WITH A MEMORY CARD

CROSS-REFERENCE TO RELATED APPLICATIONS

The present application claims priority to and incorporates by reference the entire contents of Japanese Patent Application No. 2012-049140 filed in Japan on Mar. 6, 2012.

BACKGROUND OF THE INVENTION

1. Field of the Invention

The present invention relates to an image forming apparatus such as copier, printer, and facsimile and, more particularly to a technique for storing a memory card used in updating firmware thereof or the like.

2. Description of the Related Art

In recent years, some image forming apparatuses such as copiers, printers, and facsimiles are configured such that updating firmware of the apparatus; installing optional software onto the apparatus; and the like can be performed using a memory card. Examples of an image forming apparatus including a card slot that allows using a memory card include those disclosed in Japanese Patent Application Laid-open No. 2004-101590 and Japanese Patent Application Laid-open No. 2006-175613.

However, an image forming apparatus including a card slot disclosed in Japanese Patent Application Laid-open No. 2004-101590 is disadvantageous in that the apparatus does not have a storeroom in an apparatus main body for storing a used memory card; and if a storeroom for storing a memory card is positioned at a location of easy access to the memory card, the card is in danger of being stolen.

An image forming apparatus capable of securely storing a memory card disclosed in Japanese Patent Application Laid-open No. 2006-175613 is disadvantageous in that because a component that forms a storeroom where the memory card is to be stored is formed from plastic in many cases, in which case data can be destructed by electrostatic, and in that the apparatus is poor in workability of mounting and dismounting the memory card.

There is a need to solve the problem pertaining to the conventional image forming apparatus available for use with a memory card and provide an image forming apparatus capable of storing a memory card securely.

SUMMARY OF THE INVENTION

It is an object of the present invention to at least partially solve the problems in the conventional technology.

According to an embodiment, provided is an image forming apparatus available for use with a memory card, the memory card including a housing that includes a built-in memory device and a terminal exposed from the housing. The image forming apparatus includes: a memory-card storing section that includes a pit for storing the memory card therein, the memory-card storing section being provided in a main body of the image forming apparatus as an apparatus main body; and an outer cover detachably attached to the apparatus main body to cover the memory-card storing section. At least one portion of the memory-card storing section is configured to be brought into contact with the housing of the memory card when the memory card is stored in the memory-card storing section and is configured to be electrically connected to a ground of the apparatus main body.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an exploded perspective view illustrating relevant portions of the copier illustrated in FIG. 1 and a plastic member thereof (the first embodiment);

DETAILED DESCRIPTION OF THE PREFERRED EMBODIMENTS

Exemplary embodiments are described below with reference to the accompanying drawings.

First Embodiment

First Embodiment

Figure 1:
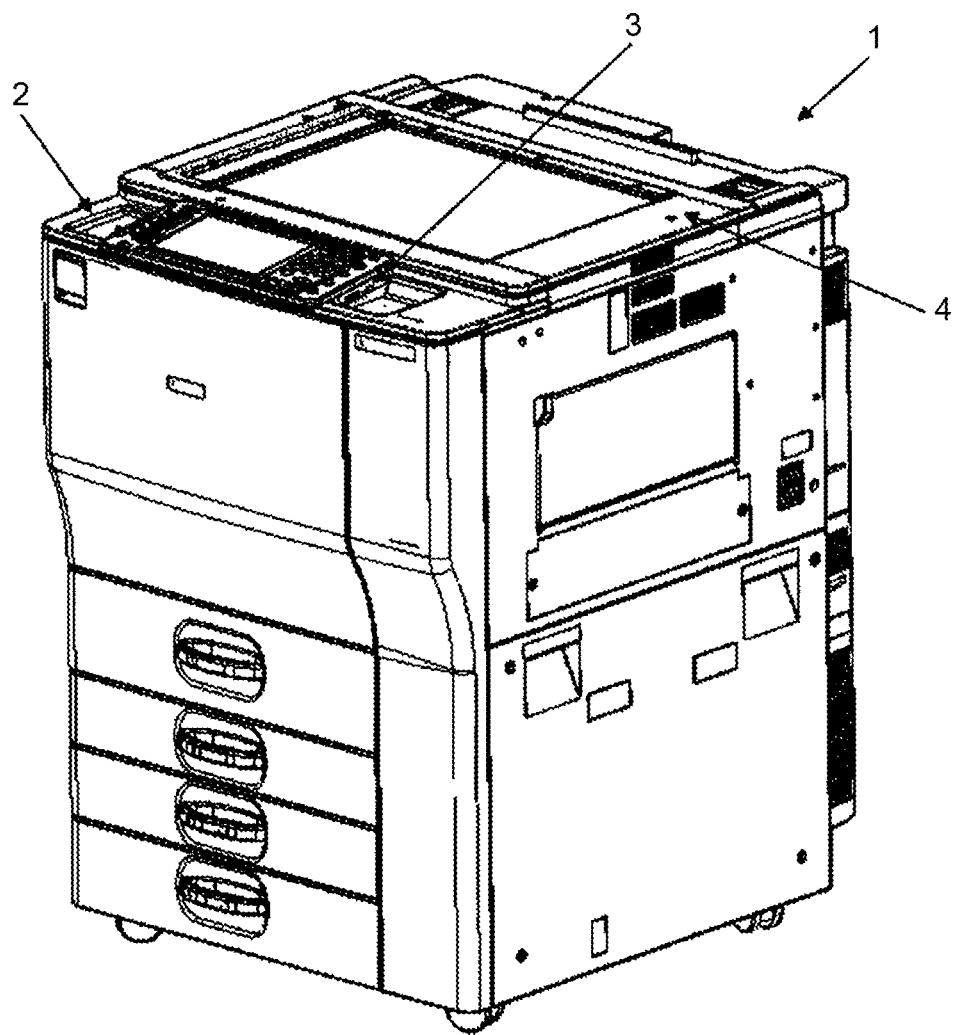
FIG. 1 is an exterior perspective view of a copier which is an implementation example of an image forming apparatus according to an embodiment (first embodiment)
Figure 2:
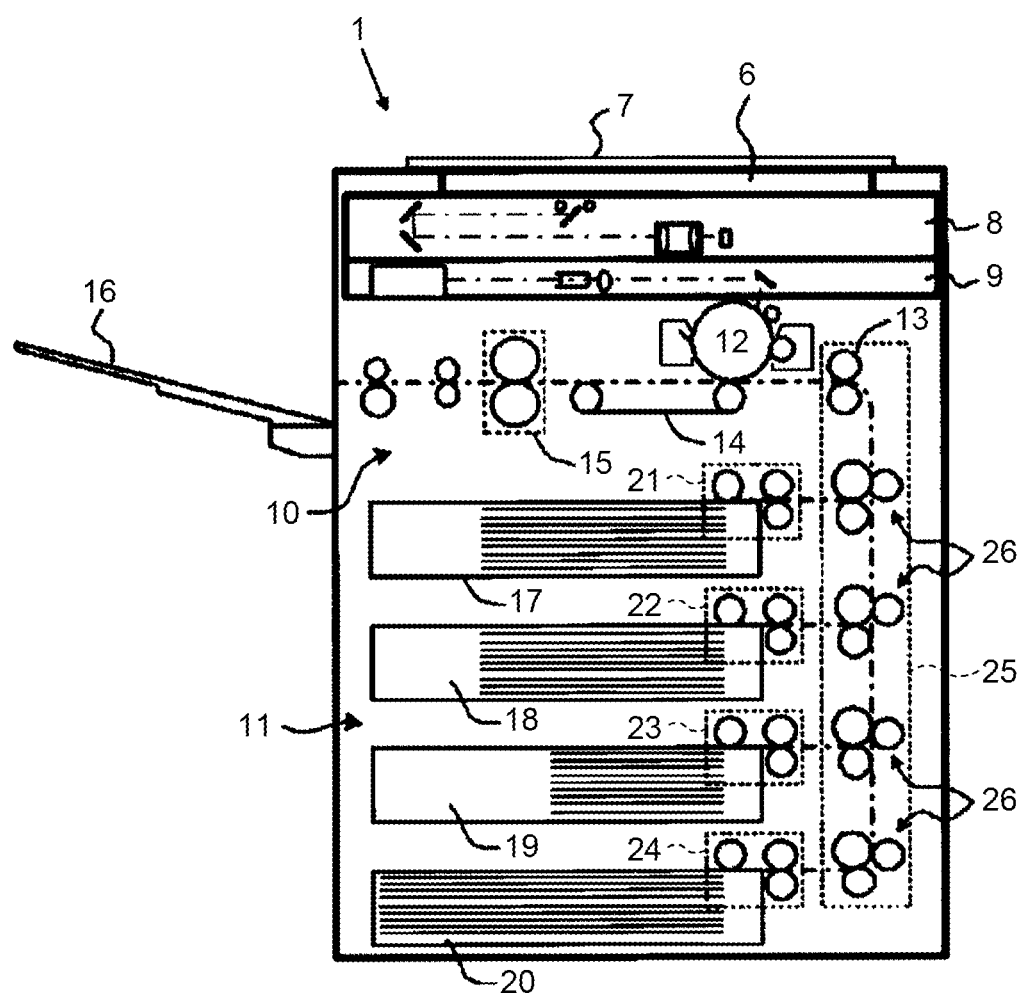
FIG. 2 is a cross-sectional view illustrating an internal configuration of the copier illustrated in FIG. 1 (the first embodiment)

FIG. 1 is an exterior perspective view of a copier which is an implementation example of an image forming apparatus according to a first embodiment. FIG. 2 is a cross-sectional view illustrating an internal configuration of the copier. The image forming apparatus according to the first embodiment is an electrophotographic digital copier.

As illustrated in FIG. 2, a copier 1 includes a scanner (reading) unit 8, a writing unit 9, an image forming section 10, and a paper feeding section 11 arranged in this order from top to bottom. An exposure glass 6 is arranged on a top surface of the writing unit 9. A pressure plate 7 that can be opened to expose a top portion of the exposure glass 6 and closed is provided. The writing unit 9 also includes a scanning optical system that includes an exposure lamp, a group of mirrors, a lens, and a charge coupled device (CCD) image sensor. An image of a document placed on the exposure glass 6 is read by the CCD image sensor, converted into an electric signal (analog image signal), and then converted into digital data (image data). The image data further undergoes predetermined image processing. Meanwhile, an automatic document feeder (ADF) can be mounted in place of the pressure plate 7.

The writing unit 9 includes a laser output unit, an imaging lens, and a mirror. The laser output unit internally includes a laser diode which is a laser light source and a polygon mirror to be rotated by a motor at a constant high speed. A laser beam emitted from the laser output unit is deflected by the polygon mirror rotating at the constant speed and, after passing through the imaging lens, reflected from the mirror to be converged onto a photosensitive element surface of the image forming section to form an image.

A photosensitive element 12 which is an image carrier is arranged in the image forming section 10. Arranged around the photosensitive element 12 are devices necessary for an electrophotographic process. The devices include an electrostatic charger, a developing unit, a cleaning unit, a transfer unit, and an electrostatic discharger.

The paper feeding section 11 includes paper feeding cassettes 17 to 20 arranged in a four-tier form, and paper feeders 21 to 24 and a vertical conveying unit 25 for feeding paper from each of the paper feeding cassettes.

A copying operation to be performed by the copier 1 configured as described above is briefly described below. A document (not shown) placed on the exposure glass 6 is read by the reading unit 8 to obtain a document image. The document image is converted into digital data, and thereafter undergoes the predetermined image processing. The laser output unit of the writing unit 9 is driven according to the image data to emit a laser beam that performs writing onto the photosensitive element 12.

The laser beam emitted from the writing unit 9 strikes the photosensitive element 12 that is electrostatically charged by the electrostatic charger to a predetermined potential, thereby forming an electrostatic latent image on the photosensitive element. The developing unit supplies toner to the electrostatic latent image to develop the electrostatic latent image into a visible toner image.

Concurrently, the paper feeder(s) and conveying rollers 26 of the vertical conveying unit 25 deliver a sheet of paper from any one of the paper feeding cassettes 17 to 20 of the paper feeding section 11 to registration rollers 13. The sheet is sent to the transfer unit at timing synchronized to the toner image on the photosensitive element 12. The toner image on the photosensitive element 12 is transferred by a transfer/conveying belt 14 which is the transfer unit. The sheet carrying the toner image thereon is conveyed to a fixing unit 15. The toner image is fixed onto the sheet with heat and pressure applied by the fixing unit 15. Thereafter, the sheet is output onto an output tray 16.

Meanwhile, the copier 1 according to the first embodiment is configured such that updating firmware of the copier 1, installing optional software onto the copier 1, and the like can be performed using a memory card. As illustrated in FIG. 1, the copier 1 includes a memory-card mounting section 3 that allows mounting a memory card onto the copier 1. The memory-card mounting section 3 is arranged adjacent to an operation panel 2. The memory-card mounting section 3 has a memory-card mounting slot (not shown) into which a memory card 32, which will be described later, is mountable. The memory card 32 can be any one of various memory cards including a CompactFlash (registered trademark) memory card, a SmartMedia (registered trademark) card, a Memory Stick (registered trademark) card, and a Secure Digital (SD) card. The memory-card mounting section 3 has the mounting slot that supports at least one of these cards.

Figure 3A:
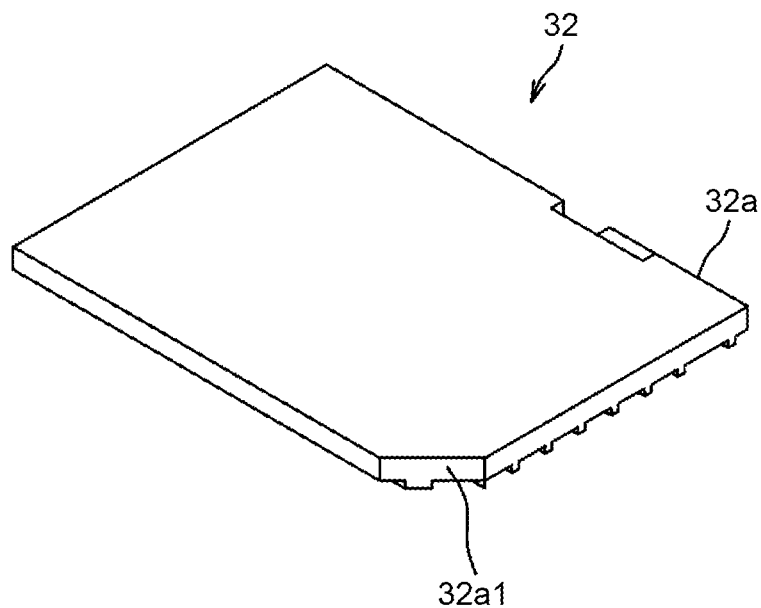
FIGS. 3A and 3B are a front-side perspective view and a back-side perspective view respectively illustrating a configuration of a memory card used in the copier illustrated in FIG. 1 (the first embodiment)
Figure 3B:
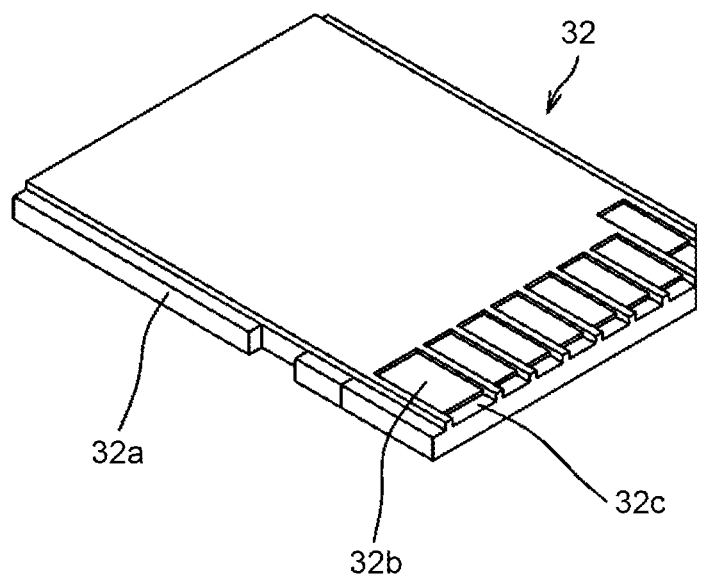

FIGS. 3A and 3B are configuration diagrams illustrating an example configuration of the memory card. As illustrated in FIGS. 3A and 3B, the memory card 32 includes a housing 32*a* that has a roughly rectangular solid shape and includes a built-in memory device (not shown), a terminal 32*b* connected to the memory device and exposed from the housing 32*a*, and a terminal groove 32*c* for preventing direct contact of a hand with the terminal 32*b*. The housing 32*a* of the memory card 32 has a corner portion 32*a*1 formed to prevent insertion of the memory card 32 into an improper memory card slot.

As illustrated in FIG. 1, the copier 1 includes an outer cover (scanner cover) 4 at a top of the copier 1. The outer cover 4 is for covering a top portion of the scanner unit (not shown). The outer cover 4 is engaged with the scanner unit at one end of the outer cover 4 and fixed at a portion near the other end with a screw to thus be mounted so as to cover the top portion of the scanner unit. Although the outer cover 4 can be removed only for various maintenance work by a maintenance worker of a manufacturer of the copier 1, it is unnecessary to remove the outer cover other than for such a maintenance work. Removal of the outer cover 4 is not to be performed by a user of the copier.

As illustrated in FIG. 4, arranged under the outer cover 4 are a metal-plate scanner cover 80 and a plastic member 27 on the metal-plate scanner cover 80 of the scanner unit 8. The metal-plate scanner cover 80 is a metal member electrically connected to a ground of an apparatus main body. The metal-plate scanner cover 80 includes a top plate 81, a sub top plate 82 arranged at a level lower than the top plate 81 by a thickness of the top plate 81, and a side plate 83 extending down from the sub top plate 82. The side plate 83 has an air-inlet opening 83*a* for a scanner cooling fan and retaining holes 83*b* for use in fixing the plastic member 27, which will be described later. The plastic member 27 includes a first plastic portion 27*a* that covers the top plate 81 and the sub top plate 82 of the metal-plate scanner cover 80 and a second plastic portion 27*b* that covers the side plate 83. The first plastic portion 27*a* and the second plastic portion 27*b* are formed in one piece. Memory storing sections 30, each of which is a punched hole having a shape that is roughly same as an outer shape of the memory card 32, are defined in the first plastic portion 27*a*. The second plastic portion 27*b* includes a louver 27*b*1 at a position corresponding to the air-inlet opening 83*a* in the side plate 83 and retaining lugs 27*b*2 at positions corresponding to the retaining holes 83*b* in the side plate 83. The louver 27*b*1 and the retaining lugs 27*b*2 are formed in one piece with the second plastic portion 27*b*.

The plastic member 27 is assembled onto the metal-plate scanner cover 80 while inserting the retaining lugs 27*b*2 of the second plastic portion 27*b* into the retaining holes 83*b* in the side plate 83. As a result, the memory-card storing sections 30, each of which is a pit capable of holding the memory card 32 therein, are formed. Each of the memory-card storing sections 30 has a bottom formed of the top plate 81 and the sub top plate 82 and side walls formed of a cross-sectional surface of the first plastic portion 27*a*. In addition, the memory-card storing section 30 has a corner portion 31 that prevents improper insertion of the memory card 32 into the memory-card storing section 30.

Figure 5:
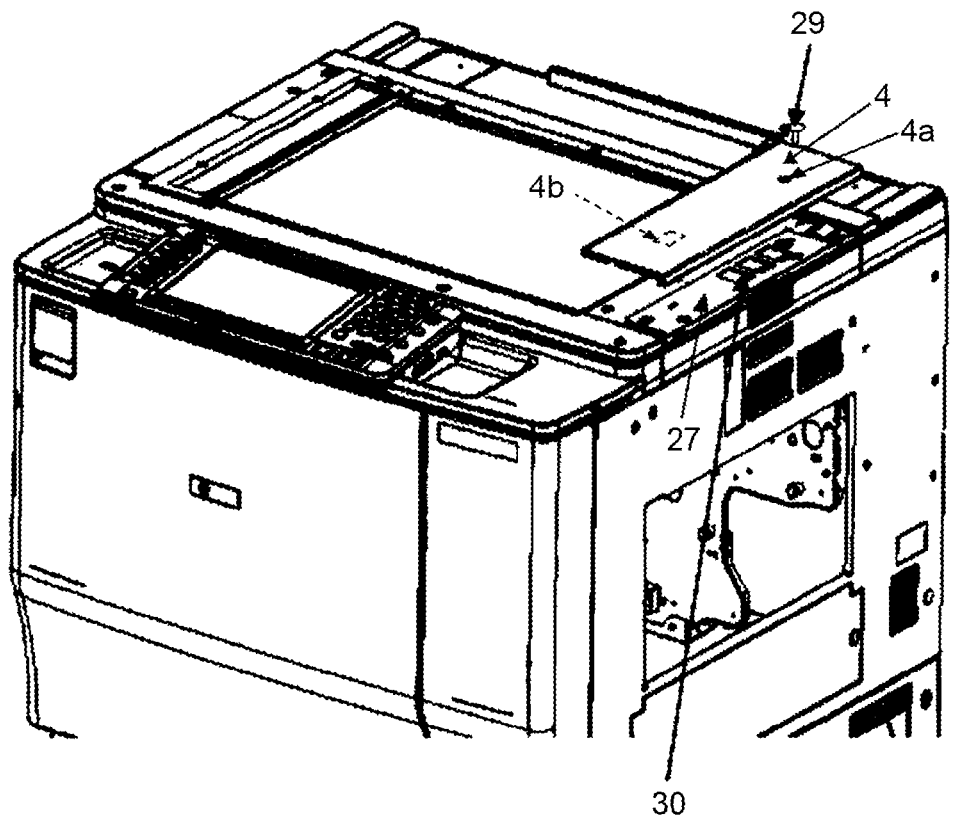
FIG. 5 is an exploded perspective view illustrating relevant portions of the copier illustrated in FIG. 1 and an outer cover (the first embodiment)

The plastic member 27 that includes the memory-card storing section 30, in which the memory card 32 is to be stored, is assembled onto the metal-plate scanner cover 80 as illustrated in FIG. 5. Thereafter, the outer cover 4 is attached so as to cover the first plastic portion 27*a* of the plastic member 27. Specifically, a retaining lug 4b formed in one piece with the outer cover 4 on a back side at a position near one end of the outer cover 4 is inserted into a retaining hole 81b (see FIG. 4) defined in the top plate 81 to be engaged in the retaining hole 81b; and a screw 29 is screwed into a screw hole 4a defined at a position near the other end, thereby fixing the outer cover 4 and the plastic member 27 onto the metal-plate scanner cover 80.

Figure 6:
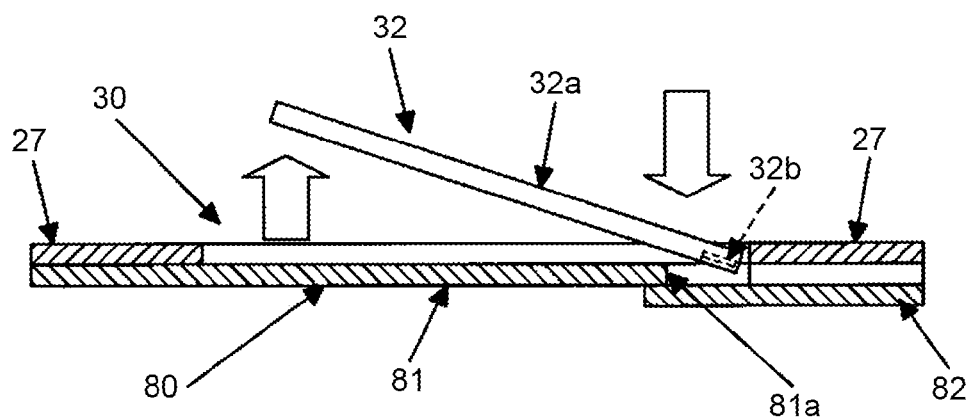
FIG. 6 is a cross-sectional view of a memory-card storing section (the first embodiment)

FIG. 6 is a cross-sectional view of the memory-card storing section 30. The bottom of the memory-card storing section 30 is formed of the top plate 81 of the metal-plate scanner cover 80 and the sub top plate 82 arranged at the level lower than the top plate 81 by the thickness of the top plate 81. Accordingly, a recess that is to be covered with the memory card 32 without making contact therewith when the memory card 32 is stored in the memory-card storing section 30 is created by a difference-in-level 81a corresponding to the thickness of the top plate 81. Space in the recess allows a user that desires to dismount the memory card 32 from the memory-card storing section 30 to dismount the memory card 32 by pressing the memory card 32 at one end from above and causing the memory card 32 to pop out.

As described above, according to the first embodiment, the memory-card storing sections 30 are arranged under the outer cover 4. Therefore, the memory card 32 used in updating firmware, installation of optional software, or the like can be stored at a location that is inconspicuous from outside and can be dismounted easily as required, and, furthermore, the memory card 32 is protected from loss and theft. The memory card 32 can thus be stored securely and reliably.

In addition, one surface of the housing 32a of the memory card 32 stored in the memory-card storing section 30 is constantly in contact with the metal-plate scanner cover 80 which forms the bottom of the memory-card storing section 30 that is electrically connected to the ground of the apparatus main body. Accordingly, it becomes possible to dissipate electrostatic built up in the memory card 32 to the metal-plate scanner cover 80, thereby protecting data of the memory device from electrostatic destruction.

Furthermore, because the scanner unit is arranged at an easy-to-operate location of the image forming apparatus in many cases, arranging the memory-card storing section 30 near the scanner unit facilitates mounting and dismounting operations.

Furthermore, the memory-card storing section 30 has the shape similar to the shape of the memory card 32. Accordingly, the terminal 32b is reliably properly oriented when the memory card 32 is stored in the memory-card storing section 30, which is preferable. Furthermore, the retaining lug 4b formed on the outer cover 4 is engaged in the retaining hole defined in the scanner metal-plate portion 80 or another component, while the other end of the outer cover 4 is fixed with the screw. Accordingly, the number of components can be reduced, and workability is increased.

Second to fourth embodiments are described below. In the second to fourth embodiments, a cleaning device that wipes the terminal 32b of the memory card 32 stored in the memory-card storing section 30 clean by utilizing motion of a movable member provided in the apparatus main body for performing a function of the image forming apparatus 1 is additionally provided.

Second Embodiment

Second Embodiment

Figure 7:
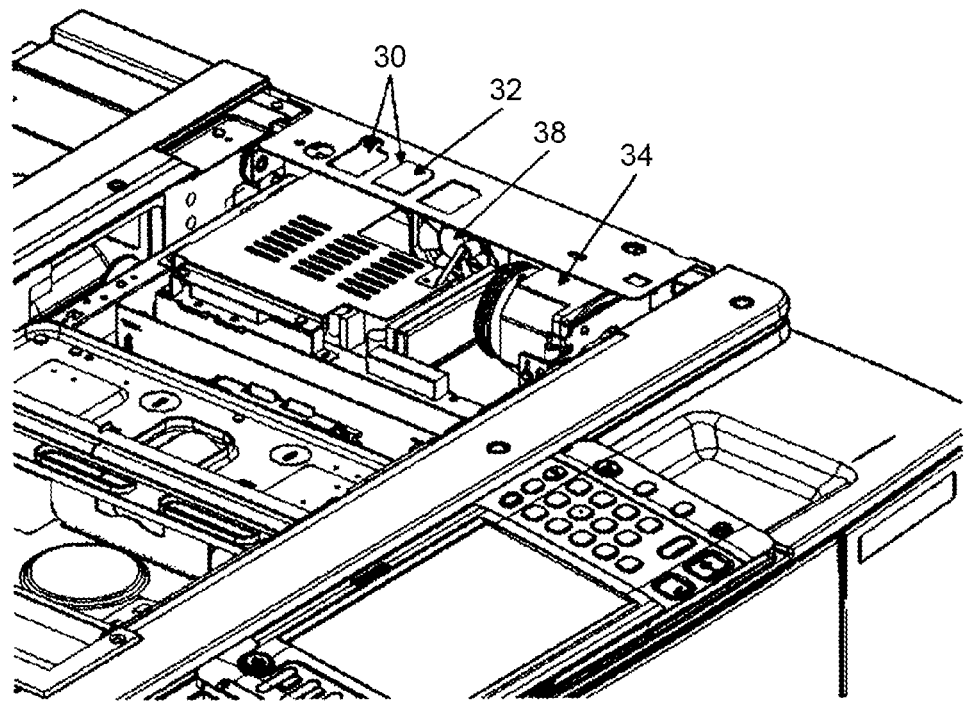
FIG. 7 is a partial perspective view of the copier illustrated in FIG. 1, depicting a movable member (second embodiment)

FIG. 7 is a partial perspective view of the copier illustrated in FIG. 1, depicting a movable member arranged near the memory-card storing section 30 according to a second embodiment. As illustrated in FIG. 7, a motor 34 is mounted on the scanner unit 8 at a position near the memory-card storing section 30 as a movable member for performing a scanner function. The motor 34 is used to move a mirror carriage (not shown).

Figure 8:
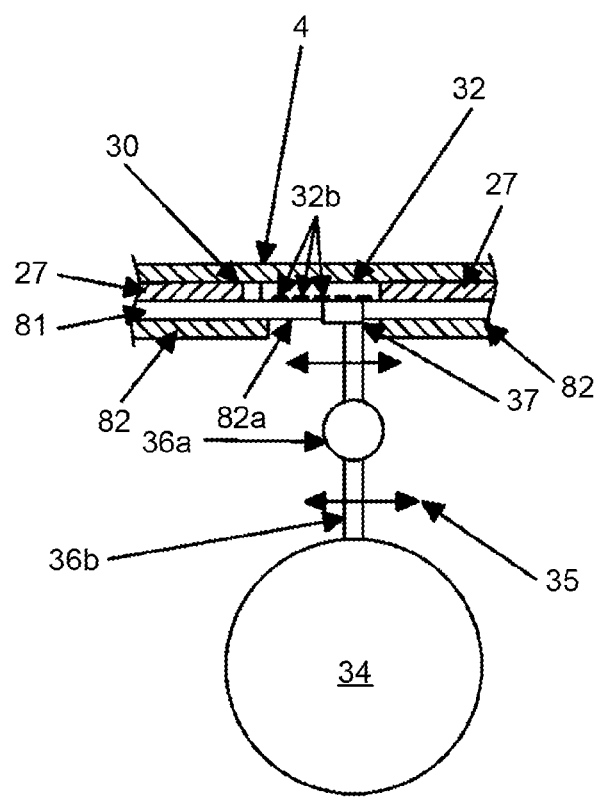
FIG. 8 is a cross-sectional view of a memory-card storing section (the second embodiment)

FIG. 8 illustrates a cleaning device 35 that cleans the terminal 32b of the memory card 32 by utilizing vibrations 37 created by the motor 34 while the motor 34 runs. The cleaning device 35 is arranged between the motor 34 and the memory-card storing section 30 and includes a lever 36b that pivots about a support point 36a. One distal end of the lever 36b is in contact with a cover of the motor 34. A cleaning brush 37 is attached to the other distal end of the lever 36b. An opening 82a that allows the cleaning brush 37 to contact the terminal 32b of the memory card 32 is defined in the sub top plate 82 of the metal-plate scanner cover 80 that forms the bottom of the memory-card storing section 30. With this configuration, the vibrations created by the motor 34 while the motor 34 runs are transmitted to the cleaning brush 37 via the lever 36b, which is a first converting member, causing the cleaning brush 37 to make a wiping motion. As a result, the terminal 32b of the memory card 32 can be cleaned. A material of the cleaning brush 37 can be animal hair, plastic bristle, or the like.

Third Embodiment

Referring to FIG. 7 again, a fan 38 is mounted as a movable member for performing a scanner function on the scanner unit 8 at a position near the memory-card storing section 30. The fan 38 is used for internal cooling of the scanner unit 8.

Figure 9:
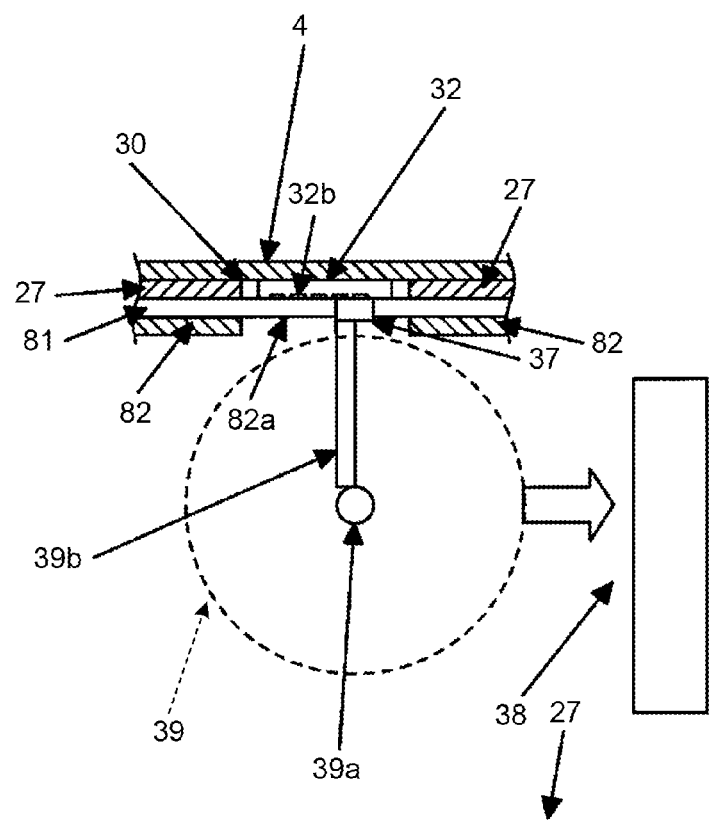
FIG. 9 is a cross-sectional view of a memory-card storing section (third embodiment)
Figure 10:
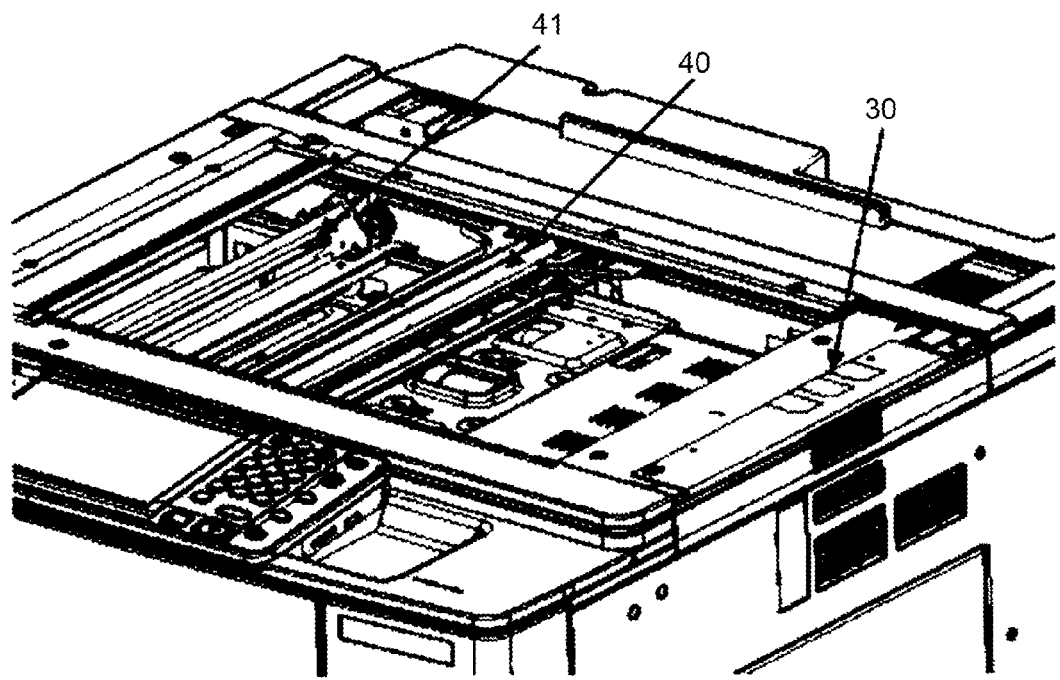
FIG. 10 is a partial perspective view of the copier illustrated in FIG. 1, depicting a movable member (fourth embodiment)

FIG. 9 illustrates a cleaning device 39 according to a third embodiment that cleans the terminal 32b of the memory card 32 by utilizing force of wind produced by the fan 38. The cleaning device 39 is arranged below the memory-card storing section 30 and includes a wind receiver 39b that rotates about a support point 39a. The cleaning brush 35 is attached to a distal end of the wind receiver 39b. The wind receiver 39b which is a third converting member is rotated by the force of wind produced the fan 38 while the fan 38 is driven, causing the cleaning brush 37 to make a wiping motion. As a result, the terminal 32b of the memory card 32 can be cleaned.
Fourth Embodiment Fourth Embodiment FIG. 10 is a partial perspective view of the copier illustrated in FIG. 1, depicting a movable member arranged near the memory-card storing section 30 according to a fourth embodiment. As illustrated in FIG. 10, a first carriage 40 and a second carriage 41 for use in image reading are mounted on the copier at positions near the memory-card storing section 30 as a movable member for performing an image reading function below the exposure glass.

Figure 11:
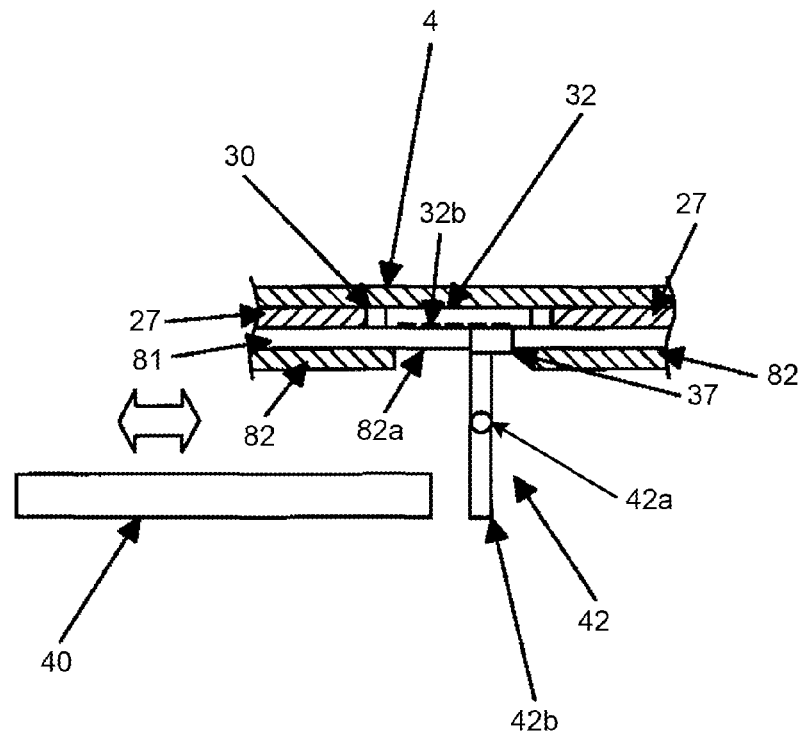
FIG. 11 is a cross-sectional view of a memory-card storing section (the fourth embodiment)

FIG. 11 illustrates a cleaning device 42 according to the fourth embodiment that cleans the terminal 32b of the memory card 32 by utilizing motion of the first carriage 40. The cleaning device 42 is arranged below the memory-card storing section 30 and includes a lever 42b that pivots about a support point 42a. The lever 42b has a portion near one distal end thereof that comes into contact with the first carriage 40. The cleaning brush 35 is attached to the other distal end of the lever 42b. The lever 42b includes a biasing member (not shown) such as a spring that biases the lever 42b back to a position illustrated in FIG. 11 when the lever 42b is pivoted relative to the illustrated position. When the first carriage 40 moves to a position beneath the memory-card storing section 30 during image reading, the first carriage 40 pushes the end of the lever 36b which is a second converting member that is pivotably fixed at the support point 42a against a biasing force of the biasing member. As a result, the cleaning brush 37 makes a wiping motion that cleans the terminal 32b of the memory card 32.

As described above, according to the second to fourth embodiments, even when the terminal 32b of the memory card 32 gets dirty while being dismounted and mounted from and into the card slot or the like, it is possible to clean the terminal 32b of the memory card 32 by storing the memory card 32 in the memory-card storing section 30. Furthermore, degradation by oxidization of the terminal 32b of the memory card 32 is prevented for a period when the memory card 32 is stored in the memory-card storing section 30.

Fifth Embodiment

Fifth Embodiment

A fifth embodiment is described below. The fifth embodiment described below facilitates dismount of the memory card 32 from the memory-card storing section 30.

Figure 12A:
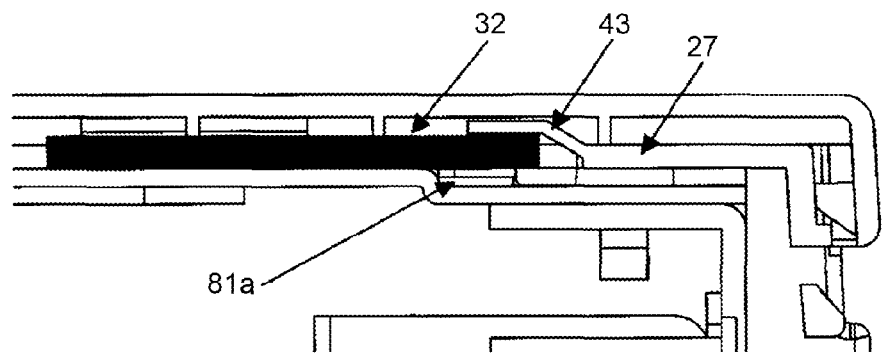
FIGS. 12 A and B are cross-sectional views of a memory-card storing section (fifth embodiment).
Figure 12B:
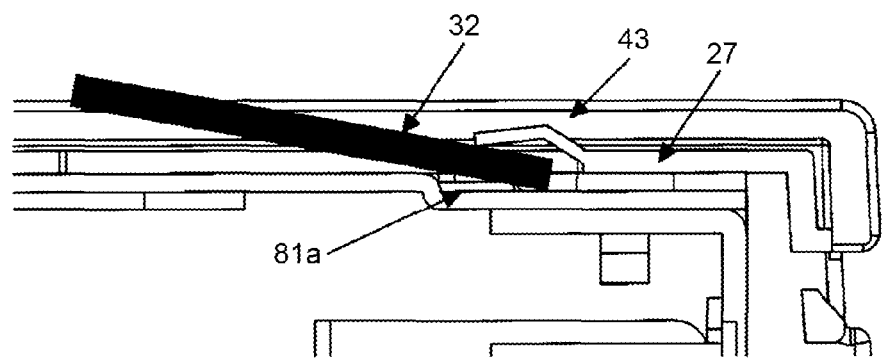

FIGS. 12 A and B are schematic cross-sectional views Illustrating a configuration according to the fifth embodiment for facilitating dismount of the memory card 32 from the memory-card storing section 30. Referring to FIG. 12, a leaf spring 43 which is a biasing member is formed in one piece with the plastic member 27 in a manner to extend from the plastic member 27 in the memory-card storing section 30. The leaf spring 43 applies a spring force to one end, which is positioned above the recess, of the memory card 32 stored in the memory-card storing section 30 from above. Accordingly, immediately when the outer cover 4 is removed, the spring force exerted by the leaf spring 43 causes the memory card 32 to automatically pop out, thereby facilitating dismount of the memory card 32.

The present invention is not limited to these embodiments described above and susceptible to various modifications and applications. All of the modifications and the applications as illustrated herein are to be considered within the scope of the invention as a matter of course.

For example, although the memory-card storing section 30 is provided in the metal-plate scanner cover of the scanner unit 8 in the embodiments described above; a position where the memory-card storing section 30 is arranged is not limited to the scanner unit 8. The memory-card storing section 30 may be arranged at any appropriate position where a metal member electrically connected to the ground of the apparatus main body is provided.

In the fifth embodiment illustrated in FIGS. 12 A and B, the biasing member (the leaf spring 43) is formed in one piece with the plastic member 27 in the manner to extend from the plastic member 27. Alternatively, a metal biasing member (leaf spring) extending from the metal member (the metal-plate scanner cover 80) electrically connected to the ground of the apparatus main body may be employed in place of the leaf spring 43. In this case, it becomes possible for a maintenance worker to touch this metal biasing member with his/her finger, thereby dissipating electrostatic built up in the maintenance worker through the metal biasing member.

In the embodiments described above, the memory-card storing section 30 is made up of the metal member (metal-plate scanner cover 80) electrically connected to the ground of the apparatus main body and the plastic member 27 mounted on the metal member; and the bottom that is to be brought into contact with the housing 32a of the memory card 32 when the memory card 32 is stored in the memory-card storing section 30 is formed of the metal member electrically connected to the ground of the apparatus main body. However, the configuration of the memory-card storing section 30 is not limited thereto. Alternatively, the memory-card storing section may be a pit formed by press working of a metal member that is electrically connected to the ground of the apparatus main body. In this case, it becomes possible to dissipate electrostatic built up in the memory card 32 or electrostatic built up in a maintenance worker through the metal member because the entire pit, including its bottom and side walls, of the memory-card storing section is formed from metal.

The image forming apparatus is not limited to a copier, but can be a facsimile, a printer, or a multifunction peripheral having a plurality of functions.

An image forming apparatus according to an embodiment includes a memory-card storing section for storing therein a memory card that includes a housing including a built-in memory device and a terminal exposed from the housing; and an outer cover detachably attached to an apparatus main body to cover the memory-card storing section. At least one portion, which is to be brought into contact with the housing of the memory card when the memory card is stored in the memory-card storing section, of the memory-card storing section is electrically connected to a ground of the apparatus main body. Therefore, the memory card can be stored in the memory-card storing section that is usually covered with the outer cover and inconspicuous from outside. Because loss and theft of the memory card and destruction of data of the memory device by electrostatic are prevented, the memory card can be stored securely.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus useable with a memory card, the memory card including a housing including a built-in memory device, and a terminal exposed from the housing, the image forming apparatus comprising:
   a memory-card storing section for storage including a pit for storing the memory card therein, the memory-card storing section being provided in a main body, of the image forming apparatus as an apparatus main body;
   an outer cover, detachably attached to the apparatus main body, to cover the memory-card storing section, wherein
   at least one portion of the memory-card storing section
     is configured to be brought into contact with the housing of the memory card when the memory card is stored in the memory-card storing section, and
     is configured to be electrically connected to a ground of the apparatus main body,
   the at least one portion of the memory card storing section, configured to be brought into contact with the housing of the memory card when the memory card is stored in the memory-card storing section, is a metal member that forms a bottom of the memory-card storing section,
   a remaining portion of the memory-card storing section, excluding the at least one portion, is formed of a plastic member fixed onto the metal member, and
   the at least one portion of the memory card storing section includes a recess that is to be covered with the memory card, but does not make contact with the memory card when the memory card is stored in the memory-card storing section; and a cleaning device, configured to wipe the terminal of the memory card stored in the memory-card storing section clean by utilizing a motion of a movable member provided in the apparatus main body for performing a function of the image forming apparatus, the movable member includes a motor, and the cleaning device includes
- a cleaning brush to wipe the terminal of the memory card clean by making a wiping motion, and
- a first converting member to transmit vibrations generated by the motor to the cleaning brush through converting the vibrations to the wiping motion, and wherein an opening to allow the cleaning brush to contact with the terminal is provided at the bottom of the memory-card storing section.

2. The image forming apparatus according to claim 1, wherein the memory-card storing section includes
- a biasing member, extending from any one of the plastic member and the metal member, to apply a biasing force to one end of the memory card,
- the one end of the memory card being above the recess.

3. The image forming apparatus according to claim 1, wherein a bottom of the recess that does not make contact with the memory card is a metal member.

4. The image forming apparatus according to claim 1, wherein when the memory card is stored in the memory card storing section, a terminal portion of the memory card is stored temporally in the recess that does not make contact with the memory card.

5. An image forming apparatus useable with a memory card, the memory card including a housing including a built-in memory device, and a terminal exposed from the housing, the image forming apparatus comprising:

a memory-card storing section for storage including a pit for storing the memory card therein, the memory-card storing section being provided in a main body of the image forming apparatus as an apparatus main body;

an outer cover, detachably attached to the apparatus main body, to cover the memory-card storing section, wherein at least one portion of the memory-card storing section
- is configured to be brought into contact with the housing of the memory card when the memory card is stored in the memory-card storing section, and
- is configured to be electrically connected to a ground of the apparatus main body, the at least one portion of the memory card storing section, configured to be brought into contact with the housing of the memory card when the memory card is stored in the memory-card storing section, is a metal member that forms a bottom of the memory-card storing section, a remaining portion of the memory-card storing section, excluding the at least one portion, is formed of a plastic member fixed onto the metal member, and the at least one portion of the memory card storing section includes a recess that is to be covered with the memory card, but does not make contact with the memory card when the memory card is stored in the memory-card storing section; and a cleaning device, configured to wipe the terminal of the memory card stored in the memory-card storing section clean by utilizing a motion of a movable member provided in the apparatus main body for performing a function of the image forming apparatus, the movable member includes a mirror carriage of a scanner, and the cleaning device includes
- a cleaning brush to wipe the terminal of the memory card clean by making a wiping motion, and
- a second converting member to transmit a linear motion of the mirror carriage to the cleaning brush through converting the linear motion to the wiping motion, and wherein an opening to allow the cleaning brush to contact with the terminal is provided at the bottom of the memory-card storing section.

6. The image forming apparatus according to claim 5, wherein the memory-card storing section includes
- a biasing member, extending from any one of the plastic member and the metal member, to apply a biasing force to one end of the memory card,
- the one end of the memory card being above the recess.

7. The image forming apparatus according to claim 5, wherein a bottom of the recess that does not make contact with the memory card is a metal member.

8. The image forming apparatus according to claim 5, wherein when the memory card is stored in the memory card storing section, a terminal portion of the memory card is stored temporally in the recess that does not make contact with the memory card.

9. An image forming apparatus useable with a memory card, the memory card including a housing including a built-in memory device, and a terminal exposed from the housing, the image forming apparatus comprising:

a memory-card storing section for storage including a pit for storing the memory card therein, the memory-card storing section being provided in a main body of the image forming apparatus as an apparatus main body;

an outer cover, detachably attached to the apparatus main body, to cover the memory-card storing section, wherein at least one portion of the memory-card storing section
- is configured to be brought into contact with the housing of the memory card when the memory card is stored in the memory-card storing section, and
- is configured to be electrically connected to a ground of the apparatus main body, the at least one portion of the memory card storing section, configured to be brought into contact with the housing of the memory card when the memory card is stored in the memory-card storing section, is a metal member that forms a bottom of the memory-card storing section, a remaining portion of the memory-card storing section, excluding the at least one portion, is formed of a plastic member fixed onto the metal member, and the at least one portion of the memory card storing section includes a recess that is to be covered with the memory card, but does not make contact with the memory card when the memory card is stored in the memory-card storing section; and a cleaning device, configured to wipe the terminal of the memory card stored in the memory-card storing section clean by utilizing a motion of a movable member provided in the apparatus main body for performing a function of the image forming apparatus, the movable member includes a fan, and the cleaning device includes
- a cleaning brush to wipe the terminal of the memory card clean by making a wiping motion, and
- a third converting member to receive force of wind generated by the fan and to convert the force to the wiping motion, and wherein
- an opening to allow the cleaning brush to contact with the terminal is provided at the bottom of the memory-card storing section.

10. The image forming apparatus according to claim 9, wherein
the memory-card storing section includes
- a biasing member, extending from any one of the plastic member and the metal member, to apply a biasing force to one end of the memory card,
- the one end of the memory card being above the recess.

11. The image forming apparatus according to claim 9, wherein a bottom of the recess that does not make contact with the memory card is a metal member.

12. The image forming apparatus according to claim 9, wherein when the memory card is stored in the memory card storing section, a terminal portion of the memory card is stored temporally in the recess that does not make contact with the memory card.

* * * * *